US007336646B2

(12) United States Patent
Müller

(10) Patent No.: US 7,336,646 B2
(45) Date of Patent: Feb. 26, 2008

(54) SYSTEM AND METHOD FOR SYNCHRONIZING A TRANSPORT STREAM IN A SINGLE FREQUENCY NETWORK

(75) Inventor: Dominique Müller, Helsinki (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 10/973,200

(22) Filed: Oct. 26, 2004

(65) Prior Publication Data

US 2006/0088023 A1 Apr. 27, 2006

(51) Int. Cl.
*H04J 3/16* (2006.01)

(52) U.S. Cl. ...................... 370/350; 370/503; 370/508; 379/57; 375/354; 348/384.1

(58) Field of Classification Search ................ 370/350, 370/503, 508; 379/57; 375/354, 355; 348/384.1
See application file for complete search history.

(56) References Cited

U.S. PATENT DOCUMENTS 5,561,701 A * 10/1996 Ichikawa ................... 340/7.26
5,819,181 A * 10/1998 Kotzin et al. ............... 455/503
6,421,358 B1 * 7/2002 Stimmel et al. ............ 370/489
6,885,680 B1 * 4/2005 Kovacevic et al. ......... 370/503
2003/0078013 A1 * 4/2003 Ferguson, Jr. ................ 455/85
2003/0112883 A1 6/2003 Ihrie et al.
2004/0005870 A1 1/2004 Yla-Jaaski et al.
2004/0103444 A1 5/2004 Weinberg et al.
2004/0187162 A1 9/2004 Wu et al.
2005/0117070 A1 6/2005 Wu et al.
2005/0120258 A1 * 6/2005 Sohda ........................ 713/400

FOREIGN PATENT DOCUMENTS

JP 10075262 A 3/1998
JP 10075263 A 3/1998
JP 2000224141 A 8/2000
WO WO 03/036395 A1 5/2003

OTHER PUBLICATIONS

Gerald Faria; *Single Frequency Networks: A Magic Feature of the COFDM*; Nov. 1999; 9 pages; ST Engineering.

(Continued)

*Primary Examiner*—Danh Le
(74) *Attorney, Agent, or Firm*—Alston & Bird LLP

(57) ABSTRACT

A single frequency network (SFN) system is provided, where the system includes a head-end and a plurality of transmitters. The head-end is capable of calculating timing information based upon a time reference having a second resolution. Thereafter, the head-end is capable of sending content including the timing information. The transmitters are capable of receiving the content including the timing information. At least one transmitter is capable of calculating a delay to synchronize the content with content received by at least one other transmitter. In this regard, the transmitter(s) are capable of calculating the delay based upon the timing information and a time reference having a first resolution, the first resolution being higher than the second resolution such that the delay has a higher accuracy than the timing information. After the delay, then, the transmitter(s) are capable of broadcasting the synchronized content to a plurality of mobile terminals.

32 Claims, 5 Drawing Sheets

OTHER PUBLICATIONS

*Digital Video Broadcasting* (*DVB*); *DVB mega-frame for Single Frequency Network* (*SFN*) *synchronization*; Jun. 2004; 18 pages; ETSI TS 101 191 v1.4.1; EBU-UER—DVB (European Broadcasting Union—Digital Video Broadcasting).

Jintao Wang, Zhixing Yang, Changyong Pan; *A New Implementation of Single Frequency Network Based on DMB-T*; ICCAS 20 Conference on Communications, Circuits and Systems; Jun. 2004; pp. 246-249; vol. 1.

* cited by examiner

SYSTEM AND METHOD FOR SYNCHRONIZING A TRANSPORT STREAM IN A SINGLE FREQUENCY NETWORK

FIELD OF THE INVENTION

The present invention generally relates to systems and methods for transferring content and, more particularly, to systems and methods for synchronizing transport streams of content in a single frequency network environment.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One such delivery technique that has shown promise is Digital Video Broadcasting (DVB). In this regard, DVB-T, which is related to DVB-C (cable) and DVB-S (satellite), is the terrestrial variant of the DVB standard. As is well known, DVB-T is a wireless point-to-multipoint data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain. On the other hand, DVB-H (handheld), which is also related to DVB-T, can provide increased performance particularly for wireless data delivery to handheld devices.

Digital broadband data broadcast networks are known. As mentioned, an example of such a network enjoying popularity in Europe and elsewhere world-wide is DVB which, in addition to the delivery of television content, is capable of delivering data, such as Internet Protocol (IP) data. Other examples of broadband data broadcast networks include Japanese Terrestrial Integrated Service Digital Broadcasting (ISDB-T), Digital Audio Broadcasting (DAB), and MBMS, and those networks provided by the Advanced Television Systems Committee (ATSC). In many such systems, a containerization technique is utilized in which content for transmission is placed into MPEG-2 packets which act as data containers. Thus, the containers can be utilized to transport any suitably digitized data including, but not limited to High Definition TV, multiple channel Standard definition TV (PAUNTSC or SECAM) and, of course, broadband multimedia data and interactive services.

As will be appreciated by those skilled in the art, digital broadband data broadcast networks can be implemented in a distributed transmission system, often referred to as a single frequency network. In such a network, a content source provides digital broadband data to a plurality of co-channel transmitters, all of which synchronously transmit the same content. More particularly, all of the transmitters in a single frequency network must generally transmit the same signals on the same frequency, and at the same time. The precision of synchronization depends on the scheme used to modulate the broadcast content. The accuracy of synchronization, however, can be in the nanosecond range (the more accurate the synchronization between the transmitters, the better the receiving conditions).

To enable the transmitters in a single frequency network to all transmit the same signals on the same frequency, the content source can provide the transmitters with a common transport stream, such as by means of a multiplexer or an IP encapsulator in the case of an IP datacast (IPDC) DVB-T/H network. Then, the common transport stream can be sent to the transport stream to the transmitters across a distribution network, and from the transmitters to a plurality of terminals. But for all of the transmitters to transmit the transport stream at the same time, the transport stream can include markers that permit the transmitters to synchronize the transport stream in time. The markers can define a reference between a position in the bit stream and a time reference. In this regard, to properly synchronize the transport stream, the transmitters typically have a common, and typically high-resolution, time reference.

Techniques have been developed to synchronize the transmitters of a single frequency network. In the case of DVB-T/H, for example, a technique to synchronize transmitters sending DVB-T/H content across a single frequency network is disclosed by the European Telecommunications Standards Institute (ETSI) Technical Specification (TS) 101 191, entitled: *Digital Video Broadcasting* (DVB): DVB *Mega-Frame for Single Frequency Network* (SFN) *Synchronization v.* 1.4.1 (2004) and related specifications, the contents of which are hereby incorporated by reference in its entirety. In accordance with the technique disclosed by ETSI TS 101 191, the single frequency network includes a transport stream source, sometimes referred to as a "head-end," that is located at a point in the single frequency network where the common transport stream is available, and can be implemented as part of a multiplexer, IP encapsulator or another separate entity. This head-end can facilitate synchronization of the transmitters by sending the transmitters timing information calculated based on a repetitive time reference and a frequency reference from a source, such as a global positioning system (GPS), which can provide a one pulse-per-second (pps) time reference and 10 MHz frequency reference, the time reference being provided with a resolution of 100 ns. The transmitters can then be synchronized with 100 ns accuracy based on the timing information and the same time and frequency references.

Since the head-end and transmitters of the technique of ETSI TS 101 191 utilize a source such as GPS to synchronize the transmitters, the head-end and transmitters typically require a GPS antenna to receive the time reference and frequency reference. Since many transmission sites having a transmitter also have mast, also placing a GPS antenna with a view to all directions at such sites is typically not an issue. However, since the head-end may comprise a server or other computer system located in an isolated space (e.g., server room), placing a GPS antenna with a view to all directions at the head-end location may undesirably complicate configuring of the single frequency network. Thus, it would be desirable to design a system and method of synchronizing a single frequency network transmission stream in a manner that achieves the same accurate synchronization as the ETSI TS 101 191 technique, without requiring a high-resolution time source (e.g., GPS source) at the head-end.

SUMMARY OF THE INVENTION

In light of the foregoing background, embodiments of the present invention provide an improved system and method for transmitting content in a single frequency network (SFN). In accordance with the system and method of embodiments of the present invention, the transmitters of a SFN are capable of receiving a repetitive time reference having a first resolution, the time reference being received from a source such as GPS. The head-end of the SFN, on the other hand, is capable of receiving a time reference having a second resolution from a source such as a network time protocol (NTP) server, the second resolution being lower than the first resolution. By receiving a time reference having a different resolution, the head-end can calculate timing information with a different, typically lower, accuracy than the transmitters calculate a delay to synchronize with one another. Thus, the system need not include a high-resolution GPS antenna with a view to all directions at the head-end location.

According to one aspect of the present invention, a SFN system is provided, where the system includes a head-end and a plurality of transmitters. The head-end is capable of calculating timing information based upon a time reference having a second resolution. In this regard the head-end can be capable of receiving the time reference from at least one network time protocol (NTP) server, such as across an Internet Protocol (IP) network. After calculating the timing information, the head-end is capable of sending content including the timing information. For example, the head-end can be capable of sending a plurality of mega-frames of content, each mega-frame including a mega-frame initialization packet (MIP) having the timing information.

The transmitters are capable of receiving the content (e.g., mega-frames) including the timing information (e.g., MIPs). At least one transmitter is capable of calculating a delay to synchronize the content with content received by at least one other transmitter. In this regard, the transmitter(s) are capable of calculating the delay based upon the timing information and a time reference having a first resolution, the first resolution being higher than the second resolution such that the delay has a higher accuracy than the timing information. Before calculating the delay, however, the transmitter(s) can be capable of receiving the time reference from a first primary time-distribution network, such as a global positioning system (GPS) network. Then, after the delay, the transmitter(s) are capable of broadcasting the synchronized content to a plurality of mobile terminals.

According to other aspects of the present invention, a head-end, transmitter and methods of transmitting content in a SFN are provided. Therefore, embodiments of the present invention provide a system and a method transmitting content in a single frequency network (SFN), as well as a head-end and a transmitter of a SFN. The system and method of embodiments of the present invention permit the head-end of a SFN to be synchronized with timing information having a lower accuracy than the delay capable of being calculated by the transmitters. And since the head-end can receive a different, lower resolution time reference than the transmitters, the system need not include a high-resolution GPS antenna with a view to all directions at the head-end location. Therefore, the system and method of embodiments of the present invention solve the problems identified by prior techniques and provide additional advantages.

BRIEF DESCRIPTION OF THE DRAWINGS

Figure 1:
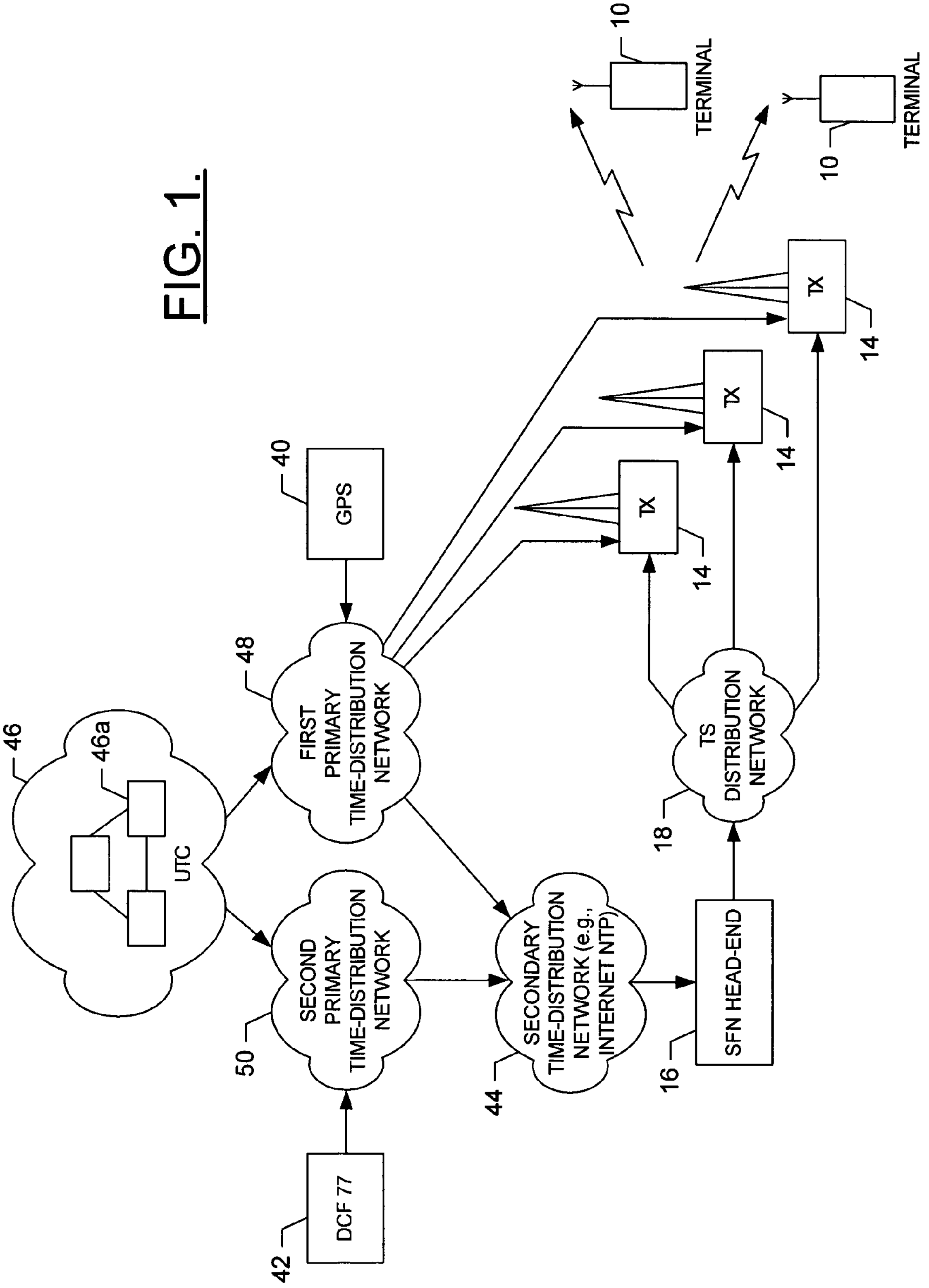
Figure 3:
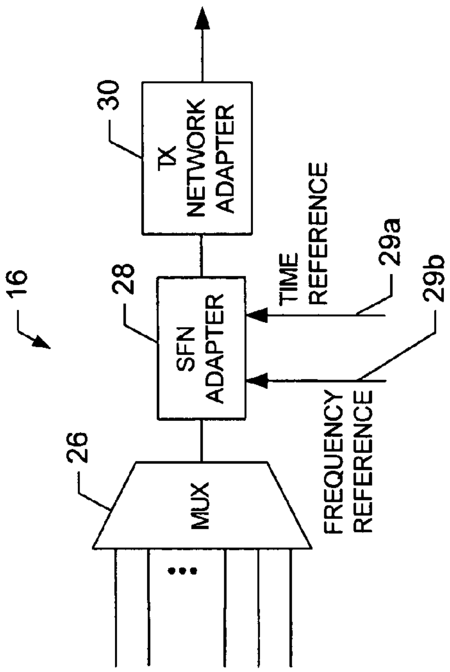
Figure 2:
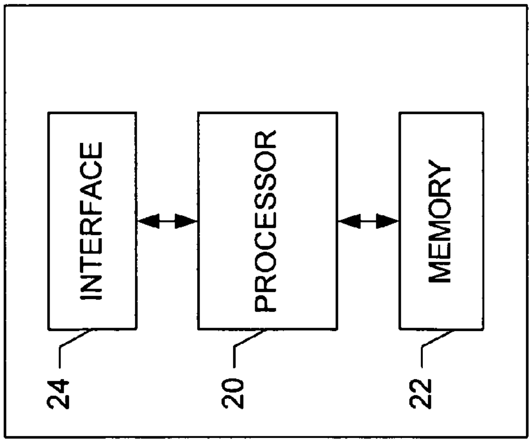
Figure 5:
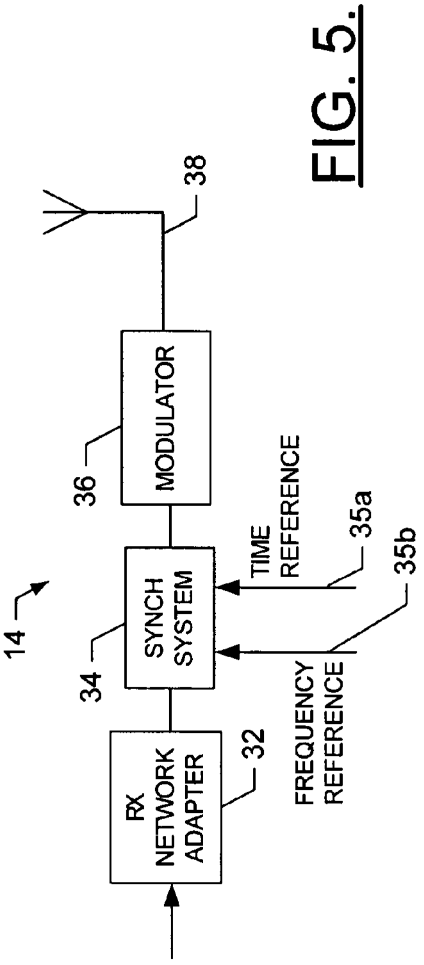
Figure 4:
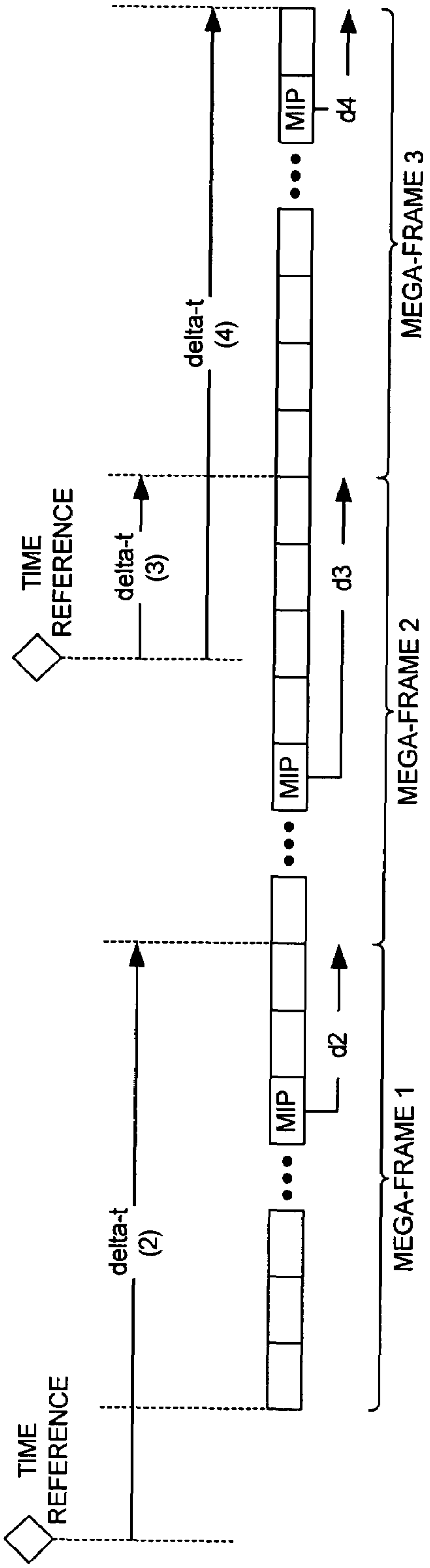
Figure 6A:
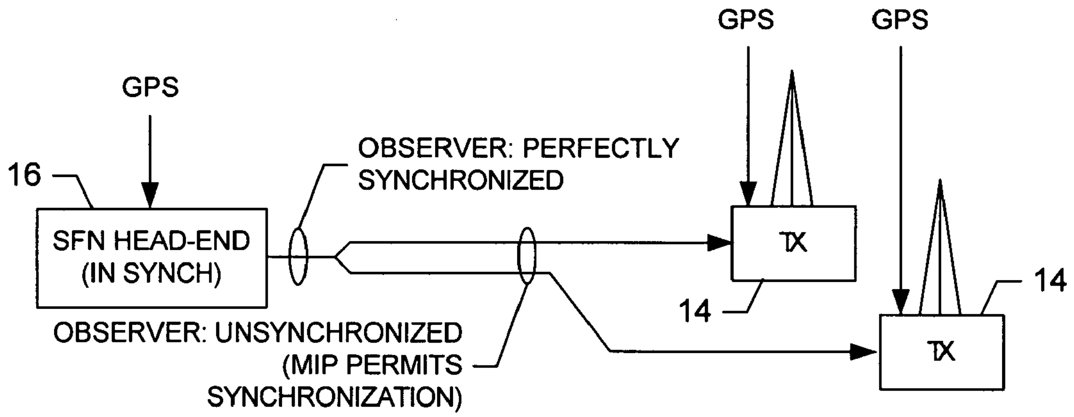
FIG. 6A. (PRIOR ART)
Figure 6B:
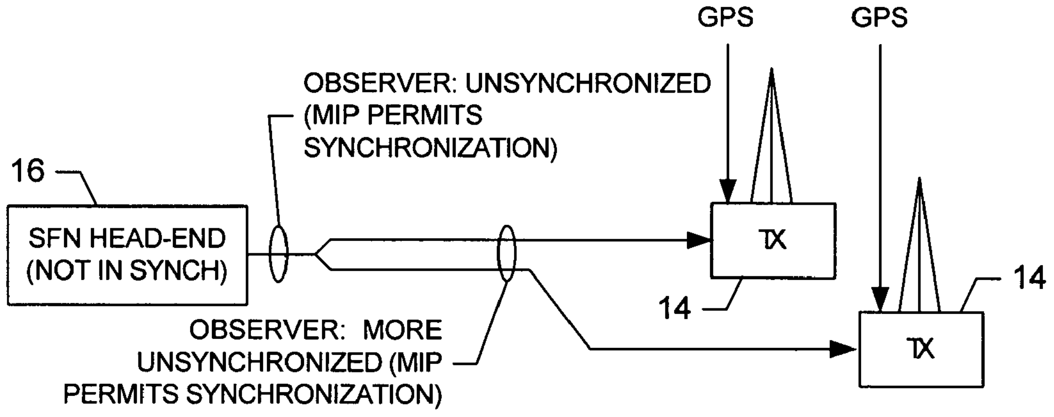
Figure 7:
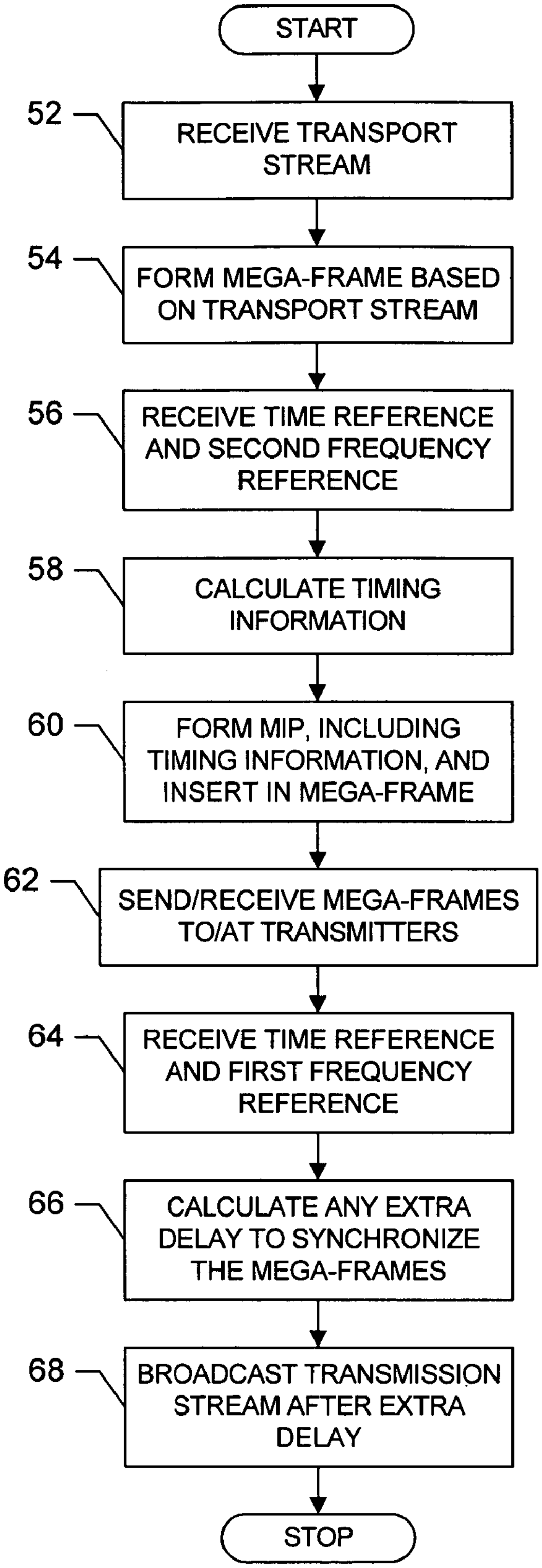

Having thus described the invention in general terms, reference will now be made to the accompanying drawings, which are not necessarily drawn to scale, and wherein:

FIG. 1 is a schematic block diagram of a single frequency network (SFN) in accordance with one embodiment of the present invention;

FIG. 2 is a schematic block diagram of an entity capable of operating as a terminal, transmitter, and/or SFN head-end, in accordance with embodiments of the present invention;

FIG. 3 is a functional block diagram of a head-end, in accordance with one embodiment of the present invention;

FIG. 4 is a timing diagram illustrating a number of mega-frames of content sent from a head-end to a plurality of transmitters in accordance with embodiments of the present invention;

FIG. 5 is a functional block diagram of a transmitter, in accordance with one embodiment of the present invention;

FIGS. 6A and 6B are functional block diagrams of a SFN head-end sending a transmission stream to a plurality of transmitters in accordance with a conventional technique and a technique of one embodiment of the present invention, respectively; and FIG. 7 is a flowchart illustrating various steps in a method of transmitting content in a single frequency network, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and single frequency network (SFN) system that would benefit from the present invention is provided. The system, method and computer program product of embodiments of the present invention will be primarily described in conjunction with mobile communications applications. More particularly, system, method and computer program product of embodiments of the present invention will be primarily described in conjunction with digital broadcast networks including, for example, DVB-T, DVB-C, DVB-S, DVB-H, DMB-T, ISDB-T, DAB, MBMS, BCMCS, ATSC networks, or the like. It should be understood, however, that the system, method and computer program product of embodiments of the present invention can be utilized in conjunction with a variety of other applications, both in the mobile communications industries (both in the digital broadcast network industries and outside the digital broadcast network industries) and outside of the mobile communications industries.

As shown, the SFN system can include a plurality of terminals 10 (two being illustrated), each of which may include an antenna for receiving signals from one or more of a plurality of transmitters (TXs) 14. Each terminal can comprise any of a number of different wireless communication devices including, for example, a mobile telephone, portable digital assistant (PDA), pager, laptop computer, broadband (e.g., DVB-T, DVB-H, etc.) receiving device, and other types of voice, text and multimedia communications systems. The transmitters can be coupled to a SFN head-end 16, such as a digital broadcaster, via a transport stream (TS) distribution network 18. The TS distribution network can comprise any of a number of wireline and/or wireless networks for distributing content to the transmitters. For example, the TS distribution network can comprise a wireline network such as a fiber optic network (e.g., OC-3 network), and/or a wireless network such as a terrestrial digital video broadcasting (e.g., DVB-T, DVB-H, ISDB-T, ATSC, etc.) network. As will be appreciated, by directly or indirectly connecting the terminals and the SFN head-end, the terminals can receive content from the SFN head-end, such as content for one or more television, radio and/or data channels. The terminal can be capable of receiving content from any of a number of different entities in any one or more of a different number of manners. In one embodiment, for example, the terminal can be capable of receiving data, content or the like in accordance with a DVB (e.g., DVB-T, DVB-H, etc.) technique as well as a cellular (e.g., 1G, 2G, 2.5G, 3G, etc.) communication technique. For more information on such a terminal, see U.S. patent application Ser. No. 09/894,532, entitled: Receiver, filed Jun. 29, 2001, the contents of which is incorporated herein by reference in its entirety.

Referring now to FIG. 2, a block diagram of an entity capable of operating as a terminal 10, transmitter 14, and/or SFN head-end 16 is shown in accordance with one embodiment of the present invention. As shown, the entity can generally include a processor 20 connected to a memory 22. The processor can also be connected to at least one interface 24 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

Reference is now made to FIG. 3, which illustrates a functional block diagram of a SFN head-end 16 of one embodiment of the present invention. The SFN head-end can include a multiplexer 26, which can be capable of multiplexing content for a number of television, radio and/or data channels. More particularly, for example, data streams including IP datagrams can be supplied from several sources, and can be encapsulated by an IP encapsulator, which can be integrated with or distributed from the SFN head-end. The IP encapsulator, in turn, can feed the encapsulated IP data streams to the multiplexer, where the encapsulated IP data streams can be multiplexed with other IP data streams, and/or content for one or more television, radio and/or data channels. After multiplexing the content, the multiplexer can then feed the resulting transport stream (TS), such as a MPEG-2 TS, into a SFN adapter 28. The SFN adapter can form a mega-frame, and insert a mega-frame initialization packet (MIP) in the mega-frame.

The MIP carries a pointer indicating the position of the MIP with respect to the start of the next mega-frame, thus uniquely identifying the starting point or packet of the next mega-frame. In addition, to facilitate synchronization of the transmitters 14, the SFN adapter 28 can also receive a repetitive time reference 29*a* and a frequency reference 29*b*, and calculate timing information based upon the references. For example, the SFN adapter can calculate a synchronization time stamp (STS) that comprises the time difference between the latest time reference received by the SFN adapter, and the starting point or packet of the next mega-frame. The SFN head-end can then copy the timing information into the MIP, which is inserted in the mega-frame. By including such information in the MIP, the SFN head-end 16 can permit the transmitters 14 to accurately align the start of a mega-frame.

In a more particular example, three mega-frames are shown in FIG. 4. As shown, the MIP in mega-frame 1 includes delta-t(2) (i.e., STS—the time difference between the latest time reference and the starting point of the next mega-frame), and d2 (i.e., the pointer indicating the position of the MIP with respect to the start of the next mega-frame). The MIP in mega-frame 2 includes delta-t(3) and d3, and the MIP in mega-frame 3 includes delta-t(4) and d4. The delta-t values can be expressed with a resolution based on the frequency reference, or more particularly corresponding to the inverse of the frequency reference. In addition, the delta-t values can be as long as the repetition rate of the time reference. In this regard, as the delta-t values or timing information indicate the time difference between the latest time reference and the starting point of the next mega-frame, the accuracy of the mega-frame synchronization can be limited by the resolution of the delta-t values.

Again referring to FIG. 3, the SFN head-end can also include a transmitter (TX) network adapter 30, which is capable of providing the transport link to send the transport stream across the TS distribution network 18 to the transmitters 14. Referring to FIG. 5, a functional block diagram of a transmitter of one embodiment of the present invention is shown. As illustrated, the transmitter can include a receiver (RX) network adapter 32 capable of providing the transport link along with the TX adapter to receive the transport stream from the TS distribution network. The RX network adapter can then provide the transport stream to a synchronization (SYNCH) system 34. As will be appreciated, the transport link can differ between the SFN head-end 16 and the different transmitters, and as such, the transport stream may not reach the RX network adapters of the transmitters at the same time (i.e., not synchronized in time).

The SYNCH system 34 can therefore receive a repetitive time reference 35*a* and a frequency reference 35*b*, and provide propagation time compensation by comparing the time information (e.g., STS) in the MIP of a mega-frame with the time reference received by the SYNCH system. The SYNCH system can then calculate any extra delay needed to synchronize the transmission stream with that of the other transmitters, the extra delay being calculated with a resolution based on the frequency reference received by the SYNCH system, or more particularly corresponding to the inverse of the frequency reference. More particularly, the SYNCH system can calculate any extra delay needed to compensate for the different propagation times between the head-end and the transmitters 14, such as by increasing the shorter delays to a maximum delay. In this regard, the maximum delay, otherwise referred to as the synchronization budget, corresponds to the maximum time difference between the initial transmission of a mega-frame at the head-end 16, and the initial transmission of the same mega-frame from any of the synchronized transmitters to a terminal 10 (explained below). For more information on such a technique for synchronizing a transmission stream in a DVB network, see ETSI TS 101 191.

After the SYNCH system 34 has provided the propagation time compensation, the SYNCH system can pass the synchronized transmission stream to a modulator 36, which is capable of modulating the transmission stream, such as in accordance with DVB-T. The modulated transmission stream can then be broadcast to one or more terminals 10, such as via an antenna 38. For information on DVB-T, see ETSI European Standard EN 300 744, entitled: *Digital Video Broadcasting* (DVB): *Framing Structure, Channel Coding* and *Modulation for Digital Terrestrial Television, v.*1.4.1 (2001) and related specifications, the contents of which are hereby incorporated by reference in their entirety.

As explained in the background section, in accordance with ETSI TS 101 191, the head-end 16, or more particularly the SFN adapter 28 of the head-end, can receive a repetitive time reference and a frequency reference, such as from a GPS, and calculate timing information based upon the references, as shown in FIG. 6A. Similarly, the transmitters, or more particularly the SYNCH systems 34 of the transmitters, can synchronize the transmission stream from the head-end based upon the same time and frequency references from the same source (e.g., GPS). Thus, the head-end and transmitters typically require a GPS antenna to receive the time reference and frequency reference. But placing a GPS antenna with a view to all directions at the head-end location may undesirably complicate configuring of the single frequency network. Thus, in accordance with embodiments of the present invention, while the transmitters are capable of receiving a repetitive time reference and a frequency reference from a source such as GPS, the head-end is capable of receiving the same or a synchronous repetitive time reference but at a different, typically lower, resolution. As such, the head-end may not be synchronized with the transmitters as the head-end sends the TS to the transmitters, as shown in FIG. 6B.

By receiving a time reference with a different resolution, the SFN adapter 28 of the head-end 16 can calculate timing information, such as a STS, with a different, typically lower, accuracy than the SYNCH systems 34 of the transmitters 14 calculate any extra delay needed to synchronize the transmission stream with that of the other transmitters. In one typical embodiment, for example, the transmitters receive a time and a frequency reference from a high-resolution source, such as a GPS. The head-end, on the other hand, receives a time and frequency reference from a lower-resolution source, such as a network time protocol (NTP) stratum server via an IP network like the Internet. Alternatively, as the timing information is purely calculated by the head-end, the head-end need not receive an external frequency reference, but can instead include an internal clock synchronized to a time reference, such as the same time reference as the transmitters. By permitting the head-end to receive a time and frequency reference from a lower-resolution source, the system need not include a GPS antenna with a view to all directions at the head-end location.

Thus, referring again to FIG. 1, the system can further include a first time source 40 and a second time source 42. The first time source, which can comprise a GPS transmitter, satellite or the like, is capable of providing the repetitive time reference and the frequency reference to the transmitters 14, the time reference being provided with a first resolution. For example, in accordance with ETSI TS 101 191 a GPS network can be capable of providing an accurate one pulse-per-second (pps) time reference and 10 MHz frequency reference to the transmitters, the time reference being provided with a 100 ns resolution. As such, the time reference and frequency reference permit the transmitters to calculate any extra delay with an accuracy of 100 ns.

The second time source 42 is capable of providing a repetitive time reference and a frequency reference to the SFN head-end 16, the time reference being provided with a second resolution different from, and typically lower than, the first resolution. For example, the second time source can be capable of providing an accurate one pulse-per-second (pps) time reference and 1 kHz frequency reference to the SFN head-end, the time reference being provided with a 1 ms resolution. Continuing the above example, then, the time reference and frequency reference permit the SFN head-end to calculate the timing information with an accuracy of 1 ms, which is $1\times10^6$ times less accurate than the transmitters calculate extra delay. The second time source 42 can be any of a number of different sources capable of providing a repetitive time reference and, if desired or otherwise required, a frequency reference. For example, the second time source can comprise a DCF-77 transmitter.

The first time source 40 can be directly coupled to the transmitters 14. In one embodiment, however, the first time source is coupled to the transmitters via a first primary time-distribution network 48, such as a GPS network. Likewise, the second time source 42 can be directly coupled to the SFN head-end 16, but in one embodiment, the second time source is coupled to the SFN head-end via a second primary time-distribution network 50, such as a DCF network. Further, the second time source can be coupled to the SFN head-end also via a secondary time-distribution network, such as a network time protocol (NTP) network 44 of one or more stratum servers in a larger IP network like the Internet.

As indicated above, the first time source 40 and the second time source 42 can provide the same or a synchronous time reference to the transmitters 14 and the SFN head-end 16, respectively, although with different resolutions. Thus, to permit the time sources to provide the same or a synchronous time reference, at least the first time source can be coupled to a time reference source. For example, the first time source can be coupled to a Coordinated Universal Time (UTC) network 46 that includes a plurality of master clocks 46*a* sometimes referred to as stratum 0 reference clocks. The first time source can be directly coupled to the time reference source, but in a more typical embodiment, the first time source is indirectly coupled to the time reference source via the first primary time-distribution network 48.

To allow the second time source 42 to provide the same time reference as the first time source 40, or a time reference synchronized to that provided by the first time source, the second time source can be coupled to a time reference source 46, such as the same UTC network 46 coupled to the first time source. The second time source can be directly coupled to the time reference source, or alternatively, coupled to the time reference source via the second time-distribution network 50. Thus, by directly or indirectly coupling both the first and second time sources to the same or synchronized time reference sources, the first and second time sources can provide the same or a synchronous time reference to the transmitters 14 and the SFN head-end 16, respectively.

Although the system can include a first time source 40 providing a time reference and a frequency reference to the transmitters 14, and a second time source 42 providing a time reference and a frequency reference to the SFN head-end 16, the system need not include both time sources. For example, the SFN head-end can be capable of receiving a time reference from the first time source via the first primary time-distribution network 48 and the secondary time-distribution network 44. In such instances, the SFN head-end can receive a time reference from the first time source, the time reference being the same that the first time source provides to the transmitters. Then, as the timing information is purely calculated by the SFN head-end, the SFN head-end need not receive an external frequency reference, but can instead include an internal clock synchronized to the same time reference as the transmitters. Alternatively, the SFN head-end can receive a frequency reference from the secondary time-distribution network, such as from a NTP stratum server.

Reference is now made to FIG. 7, which illustrates various steps in a method of transmitting content in a single frequency network in accordance with one embodiment of the present invention. As described below, a number of examples will be given with respect to transmitting content in accordance with a DVB technique, such as in conformance with ETSI EN 300 744 and/or ETSI TS 101 191. Also, for purposes of example, consider that the method transmits content with 8 MHz channel spacing, in 2K mode, with the data carriers in each OFDM frame modulated in accordance with QPSK (quaternary phase shift keying), a one-quarter guard interval and a two-thirds code rate.

As shown in block 52, the method includes receiving a transport stream (TS), such as an MPEG-2 TS, at the SFN adapter 28. The transport stream can include, for example, content for a number of television, radio and/or data channels. In accordance with DVB, for example, the transport stream can comprise a number of OFDM (orthogonal frequency division multiplexing) super-frames. More particularly, in accordance with ETSI EN 300 744, each OFDM super-frame includes four OFDM frames, each of which include 68 OFDM symbols. With a one-quarter guard interval, then, each OFDM symbol has a duration of 280 ms, for a super-frame duration of 76.16 ms. And with a two-thirds code rate, each super-frame includes 336 TS packets. Thus, in this example, a transport stream includes 4.411764 (i.e., 336/76.16) TS packets per ms.

After receiving the transport stream, a mega-frame can be formed, such as by the SFN adapter 28, based upon the transport stream, as shown in block 54. In accordance with ETSI TS 101 191, for example, a mega-frame can be formed to include eight OFDM super-frames, with each mega-frame having a duration of 609.28 ms and including 2688 TS packets. As the mega-frame is formed, a repetitive time reference (e.g., 1 pps time reference) and a second frequency reference (e.g., 1 kHz) can be received, such as from the second time source 42, with the time reference being received with a second resolution (e.g., 1 ms), as shown in block 56. As the time and second frequency references are received, timing information (e.g., STS) can be calculated based upon the references, as shown in block 58. As explained above, timing information such as a STS can include the time difference between the latest time reference received by the SFN adapter, and the starting point or packet of the next mega-frame. And with a 1 kHz frequency reference, for example, the timing information can be calculated with an accuracy of 1 ms.

After calculating the timing information, a mega-frame initialization packet (MIP) can be formed to include the timing information, and inserted in each mega-frame, as shown in block 60. In this regard, ETSI TS 101 191 specifies that each mega-frame includes one MIP. As explained above, in addition to the timing information, each MIP also includes a pointer indicating the position of the MIP with respect to the start of the next mega-frame, thus uniquely identifying the starting point or packet of the next mega-frame.

Once the MIP is inserted in a mega-frame, the mega-frame can be sent to one or more transmitters 14, such as from the SFN adapter 28 across a TS distribution network 18 to the transmitters, as shown in block 62. Presume, for example, that a first mega-frame is sent to the transmitters at exactly second 0 of a given day (e.g., the day the SFN head-end 16 is initialized). Because each mega-frame includes 2688 TS packets, one of the first 2688 TS packets received by the transmitters must be the MIP. In this regard, if the MIP is the 100th packet received by the transmitters, the MIP includes a pointer to the start of the next mega-frame, the pointer in this example having the value 2588 (i.e., 2688−100). In addition to the pointer, the MIP includes timing information indicating the start of the next mega-frame. And considering the timing reference as being received at the same time as the first mega-frame is sent to the transmitters, the timing information in the first mega-frame can have the value 609.28 ms (i.e., the duration of the mega-frame).

Continuing the foregoing example, consider that the second mega-frame is sent to the transmitters 14 at time 609.28 ms. The second mega-frame is therefore also sent within the same second 0 and thus before the next timing reference is received at the SFN adapter 28 (and transmitters), presuming a 1 pps timing reference. The MIP within the second mega-frame includes timing information having a value of 218.56 ms (i.e., 609.28 ms+609.28 ms modulo 1,000 ms) since the timing information resets to zero when the SFN head-end receives the second timing reference at 1 s.

The third mega-frame is sent to the transmitters 14 within the first second, or rather at time 1.21856 seconds, and the MIP within the third mega-frame includes timing information having a value of 827.84 ms (i.e., 218.56 ms+609.28 ms modulo 1,000 ms). As will be appreciated, the fourth, fifth and the remainder of the mega-frames can be sent from the SFN head-end 16 to the transmitters in a like manner. As can be seen, then, the timing information in the MIPs can be calculated without a high-resolution clock (e.g., without a high frequency reference), just based on the definitions of a mega-frame. The only reason why time synchronization is needed is to output the transport stream at the correct bit rate.

After the SFN head-end 16 sends the mega-frames, the transmitters 14 receive the mega-frames and prepare the TS packets for transmission to the terminals 10. In this regard, as indicated above, the transport link can differ between the SFN head-end and the different transmitters. Thus, the mega-frames may not reach the transmitters at the same time (i.e., not synchronized in time). To synchronize each mega-frame between the transmitters, then, the SYNCH system 34 of each transmitter can therefore receive a repetitive time reference (e.g., 1 pps time reference) and a first frequency reference (e.g., 10 MHz) from the first time source 40, as shown in block 64.

The SYNCH system 34 can then compare the time information (e.g., STS) in the MIP of a mega-frame with the time reference received by the SYNCH system, and calculate any extra delay needed to synchronize the mega-frame with that of the other transmitters, with the time reference being received with a first resolution (e.g., 100 ns), as shown in block 66. As also indicated above, the SYNCH system can calculate the extra delay with a resolution based on the first frequency reference received by the SYNCH system. For example, with a 10 MHz frequency reference, the extra delay can be calculated with an accuracy of 100 ns, which may be much more accurate than the timing information calculated by the SFN head-end 16.

More particularly, the SYNCH system 34 can calculate any extra delay needed to compensate for the different propagation times between the SFN head-end 16 and the transmitters 14, such as by increasing the shorter delays to a maximum delay. The maximum delay, or synchronization budget, corresponds to the maximum time difference between the initial transmission of a mega-frame at the SFN head-end, and the initial transmission of the same mega-frame from any of the synchronized transmitters to a terminal 10. As defined in ETSI TS 101 191, the transmitters may have a synchronization budget of 1 s when the SFN head-end and the transmitters receive the same time reference and the same frequency reference.

In accordance with embodiments of the present invention, however, the SFN head-end may calculate the timing information with less accuracy than the transmitters 14 calculate extra delay. The timing inaccuracy in the SFN head-end can add up to the propagation delays due to the different propagation times between the SFN head-end and the transmitters. Thus, while the transmitters may otherwise have a synchronization budget of 1 s, the timing inaccuracy (timing jitter) may somewhat diminish the synchronization budget. Even in such an instance, however, any inaccuracy in the timing at the SFN head-end is typically negligible as compared to the synchronization budget of 1 s.

After calculating any extra delay, the SYNCH systems 34 can buffer or otherwise delay the TS packets for the calculated extra delay. Then, once the SYNCH systems have provided such propagation time compensation, the transmitters 14, or more particularly the modulators 36 of the transmitters can modulate the TS packets. The transmitters can then broadcast the modulated transmission stream, or more particularly the modulated TS packets, to one or more terminals, such as via antennas 38, as shown in block 68.

According to one aspect of the present invention, all or a portion of the system of the present invention, such all or portions of the SFN adapter 28 of the SFN head-end 16 and/or the SYNCH systems 34 of the transmitters 14, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 7 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowchart. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A single frequency network (SFN) system comprising:

a head-end configured to calculate timing information based upon a time reference having a second resolution, wherein the head-end is configured to thereafter send content including the timing information; and a plurality of transmitters configured to receive the content including the timing information, wherein at least one transmitter is configured to calculate a delay to synchronize the content with content received by at least one other transmitter, the delay being calculated based upon the timing information and a time reference having a first resolution, the first resolution being higher than the second resolution such that the delay has a higher accuracy than the timing information, and wherein the at least one transmitter is configured to broadcast the synchronized content to a plurality of mobile terminals after the delay.

2. A system according to claim 1, wherein the head-end is configured to send, and the plurality of transmitters are configured to receive, a plurality of mega-frames of content, each mega-frame including a mega-frame initialization packet (MIP) having the timing information.

3. A system according to claim 1, wherein the head-end is configured to receive the time reference from at least one network time protocol (NTP) server.

4. A system according to claim 3, wherein the head-end is configured to receive the time reference from the NTP server across an Internet Protocol (IP) network.

5. A system according to claim 3, wherein the at least one transmitter is configured to receive the time reference from a first primary time-distribution network before calculating the delay.

6. A system according to claim 5, wherein the at least one transmitter is configured to receive the time reference from a first primary time-distribution network comprising a global positioning system (GPS) network.

7. An apparatus comprising:

a processor configured to calculate timing information based upon a time reference having a second resolution, wherein the processor is configured to send content including the timing information to a plurality of transmitters, the content being sent to thereby enable at least one transmitter to calculate a delay to synchronize the content with content received by at least one other transmitter, the delay being calculated based upon the timing information and a time reference having a first resolution, the first resolution being higher than the second resolution such that the delay has a higher accuracy than the timing information, and wherein the processor is configured to send the content to thereby enable the at least one transmitter to broadcast the synchronized content to a plurality of mobile terminals.

8. An apparatus according to claim 7, wherein the processor is configured to send a plurality of mega-frames of content, each mega-frame including a mega-frame initialization packet (MIP) having the timing information.

9. An apparatus according to claim 7, wherein the processor is configured to receive the time reference and from at least one network time protocol (NTP) server.

10. An apparatus according to claim 9, wherein the processor is configured to receive the time reference from the NTP server across an Internet Protocol (IP) network.

11. An apparatus according to claim 9, wherein the processor is configured to send content to thereby enable at least one transmitter is capable of synchronizing to synchronize the content based upon a time reference received by the at least one transmitter from a first primary time-distribution network before synchronizing the content.

12. An apparatus according to claim 11, wherein the processor is configured to send content to thereby enable at least one transmitter to synchronize the content based upon a time reference received by the at least one transmitter from a first primary time-distribution network comprising a global positioning system (GPS) network.

13. An apparatus comprising:

a processor configured to receive content from a head-end, the content including timing information calculated based upon a time reference having a second resolution, wherein the processor is configured to calculate a delay to synchronize the content with content received by at least one other transmitter based upon the timing information and a time reference having a first resolution, the first resolution being higher than the second resolution such that the delay has a higher accuracy than the timing information the content being configured for broadcast to a plurality of mobile terminals after the delay.

14. An apparatus according to claim 13, wherein the processor is configured to receive content comprising a plurality of mega-frames of content, each mega-frame including a mega-frame initialization packet (MIP) having the timing information.

15. An apparatus according to claim 13, wherein the processor is configured to receive the time reference from a first primary time-distribution network before calculating the delay.

16. An apparatus according to claim 15, wherein the processor is configured to receive the time reference from a first primary time-distribution network comprising a global positioning system (GPS) network.

17. An apparatus according to claim 15, wherein the processor is configured to receive content including timing information calculated based upon a time reference received by the head-end from at least one network time protocol (NTP) server.

18. An apparatus according to claim 17, wherein the processor is configured to receive content including timing information calculated based upon a time reference received by the head-end from the NTP server across an Internet Protocol (IP) network.

19. A method of transmitting content in a single frequency network (SFN), the method comprising:

calculating timing information based upon a time reference having a second resolution; and sending content including the timing information to a plurality of transmitters, wherein sending content comprises sending content to thereby enable at least one transmitter to calculate a delay to synchronize the content with content received by at least one other transmitter, the delay being calculated based upon the timing information and a time reference having a first resolution, the first resolution being higher than the second resolution such that the delay has a higher accuracy than the timing information, and to thereby enable the at least one transmitter to broadcast the synchronized content to a plurality of mobile terminals.

20. A method according to claim 19, wherein sending content comprises sending a plurality of mega-frames of content, each mega-frame including a mega-frame initialization packet (MIP) having the timing information.

21. A method according to claim 19 further comprising:

receiving the time reference from at least one network time protocol (NTP) server.

22. A method according to claim 21, wherein receiving the time reference and the second frequency reference comprises receiving the time reference from the NTP server across an Internet Protocol (IP) network.

23. A method according to claim 21, wherein sending content comprises sending content to thereby enable at least one transmitter to synchronize the content based upon a reference received by the at least one transmitter from a first primary time-distribution network before synchronizing the content.

24. A method according to claim 23, wherein sending content comprises sending content to thereby enable at least one transmitter to synchronize the content based upon a reference received by the at least one transmitter from a first primary time-distribution network comprising a global positioning system (GPS) network.

25. A method of transmitting content in a single frequency network (SFN) including a plurality of transmitters, wherein for each transmitter the method comprises:

receiving content from a head-end, the content including timing information calculated based upon a time reference having a second resolution;

calculating a delay to synchronize the content with content received by at least one other transmitter based upon the timing information and a time reference having a first resolution, the first resolution being higher than the second resolution such that the delay has a higher accuracy than the timing information; and broadcasting the content to a plurality of mobile terminals after the delay.

26. A method according to claim 25, wherein receiving content comprises receiving a plurality of mega-frames of content, each mega-frame including a mega-frame initialization packet (MIP) having the timing information.

27. A method according to claim 25 further comprising:

receiving the time reference from a first primary time-distribution network before calculating the delay.

28. A method according to claim 27, wherein receiving the time reference from a first primary time-distribution network comprises receiving the time reference from a global positioning system (GPS) network.

29. A method according to claim 27, wherein receiving content comprises receiving content including timing information calculated based upon a time reference received by the head-end from at least one network time protocol (NTP) server.

30. A method according to claim 29, wherein receiving content comprises receiving content including timing information calculated based upon a time reference received by the head-end from the NTP server across an Internet Protocol (IP) network.

31. An apparatus comprising:

a means for calculating timing information based upon a time reference having a second resolution; and a means for sending content including the timing information to a plurality of transmitters, wherein sending content comprises sending content to thereby enable at least one transmitter to calculate a delay to synchronize the content with content received by at least one other transmitter, the delay being calculated based upon the timing information and a time reference having a first resolution, the first resolution being higher than the second resolution such that the delay has a higher accuracy than the timing information, and to thereby enable the at least one transmitter to broadcast the synchronized content to a plurality of mobile terminals.

32. An apparatus comprising:

a means for receiving content from a head-end, the content including timing information calculated based upon a time reference having a second resolution;

a means for calculating a delay to synchronize the content with content received by at least one other transmitter based upon the timing information and a time reference having a first resolution, the first resolution being higher than the second resolution such that the delay has a higher accuracy than the timing information; and a means for broadcasting the content to a plurality of mobile terminals after the delay.

* * * * *

UNITED STATES PATENT AND TRADEMARK OFFICE

CERTIFICATE OF CORRECTION

PATENT NO. : 7,336,646 B2
APPLICATION NO. : 10/973200
DATED : February 26, 2008
INVENTOR(S) : Muller It is certified that error appears in the above-identified patent and that said Letters Patent is hereby corrected as shown below:

Column 13,

Line 23, cancel "capable of synchronizing".

Signed and Sealed this

Eighth Day of July, 2008

JON W. DUDAS

*Director of the United States Patent and Trademark Office*